United States Patent [19]

Alcorn, Sr.

[11] Patent Number: 5,682,424
[45] Date of Patent: Oct. 28, 1997

[54] TELEPHONE MOUTHPIECE PROTECTIVE COVER

[76] Inventor: Roosevelt Alcorn, Sr., 2711 S. Glen Haven, Houston, Tex. 77025

[21] Appl. No.: 632,917

[22] Filed: Apr. 16, 1996

Related U.S. Application Data

[63] Continuation of Ser. No. 298,768, Aug. 31, 1994, abandoned.

[51] Int. Cl.[6] .................................................. H04M 1/00
[52] U.S. Cl. ........................................ 379/452; 379/439
[58] Field of Search .................................. 379/452, 437, 379/447, 451, 439

[56] References Cited

U.S. PATENT DOCUMENTS

| | | | |
|---|---|---|---|
| 1,168,284 | 1/1916 | Claussen | 379/452 |
| 2,291,030 | 7/1942 | Faltz | 379/452 |
| 3,231,688 | 1/1966 | Ugartechea | 379/447 |
| 3,238,313 | 3/1966 | Kalogris | 379/452 |
| 3,243,527 | 3/1966 | Sternheim | 379/452 |
| 3,573,398 | 4/1971 | Kulka | 379/447 |
| 3,589,106 | 6/1971 | Onuki | 379/452 |
| 3,666,898 | 5/1972 | Ferrara | 381/158 |
| 4,905,276 | 2/1990 | Catey et al. | 379/447 |
| 5,054,063 | 10/1991 | Lo et al. | 379/452 |
| 5,215,222 | 6/1993 | McGill | 272/95 |

FOREIGN PATENT DOCUMENTS

| | | | |
|---|---|---|---|
| 41015 | 10/1929 | Denmark | 379/452 |
| 2119203 | 11/1983 | United Kingdom | 379/452 |

*Primary Examiner*—Thomas W. Brown
*Assistant Examiner*—Jack Chiang
*Attorney, Agent, or Firm*—Gifford, Krass, Groh, Sprinkle, Patmore, Anderson & Citkowski, P.C.

[57] ABSTRACT

A protective cover for a telephone mouthpiece and earpiece having a protective cover member with slots therethrough and deflector bars recessed below and spaced from the protective cover member. Openings are formed at the internal edges of the slots and the deflector bars. A skirt depending from the protective cover member has locking tabs located on the inside of the skirt to permit the attachment of the protective cover over the telephone mouthpiece and earpiece, and a detachment flange extending normal from the skirt for removal of the protective cover from the telephone. A portion of the cover member is cutaway to ensure an accommodating fit over the telephone mouthpiece and earpiece.

10 Claims, 2 Drawing Sheets

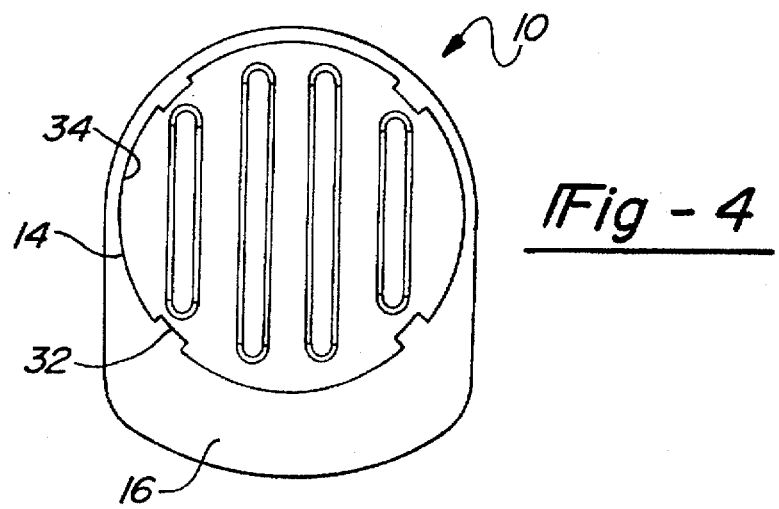
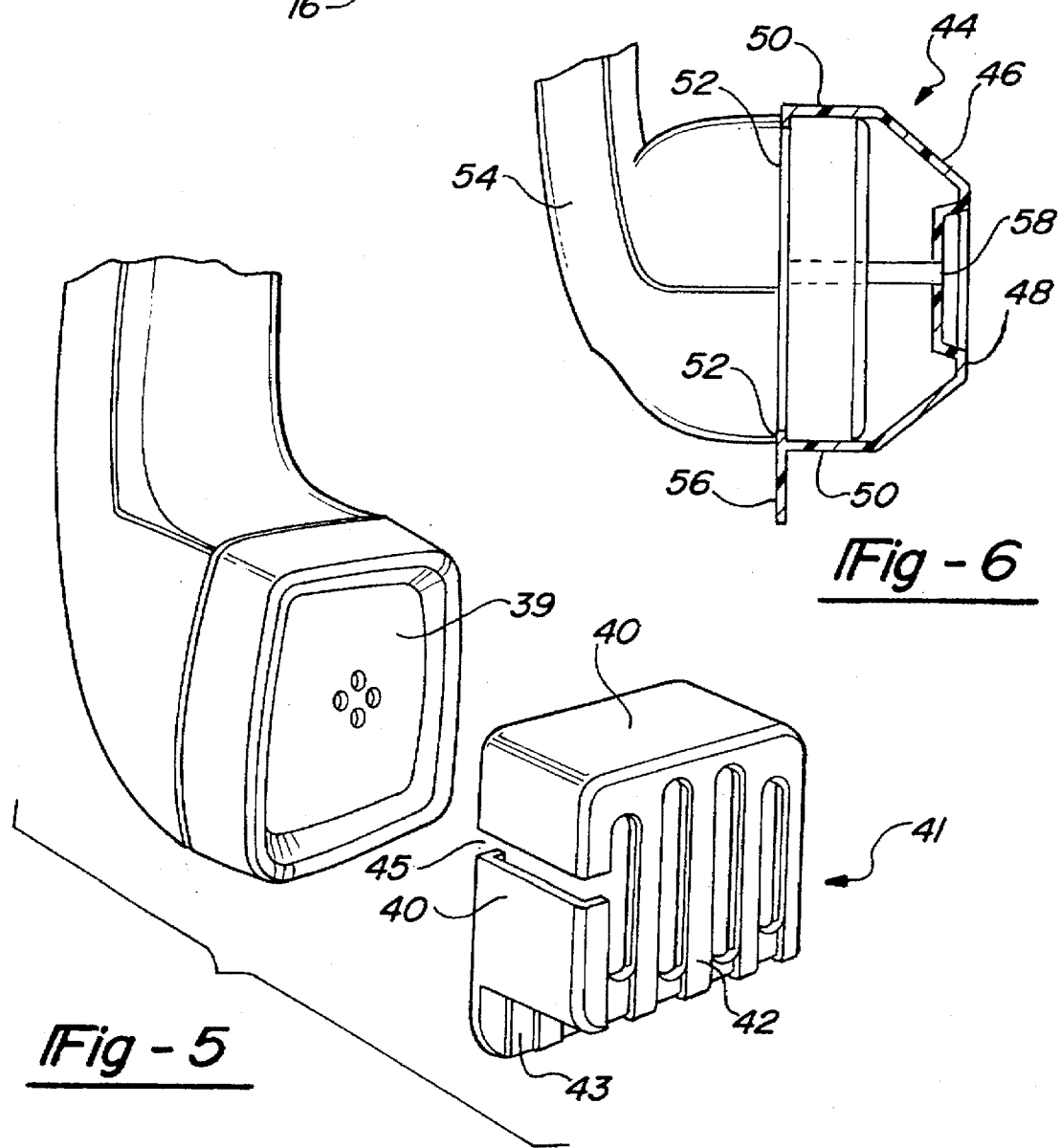

TELEPHONE MOUTHPIECE PROTECTIVE COVER

This application is a continuation of application Ser. No. 08/298,768 filed on Aug. 31, 1994, now abandoned.

BACKGROUND OF THE INVENTION

I. Field of the Invention

The present invention relates to protective covers. More particularly, the present invention relates to a telephone mouthpiece and earpiece protective cover.

II. Description of the Prior Art

Telephone users have long realized that prior users of the telephone instrument leave recognizable visible or aromatic traces of cologne, lipstick, makeup, or dirt and invisible disease causing microorganisms or germs and viral agents on the hand set and particularly on the mouthpiece of the hand set.

This is a problem especially when the telephone user touches his or her lips to the mouthpiece or earpiece or otherwise deposits saliva and/or microorganisms which may still be active when the telephone is used thereafter by another person. Children or animals may establish tongue contact with the mouthpiece or earpiece and deposit mouth fluids when they "talk" to the party on the other end of the telephone line.

Since the early days of telephones, cleaning of the telephone instrument itself has been intermittent if it occurs at all. The standard telephone has a removable mouthpiece or earpiece which can be unscrewed and cleaned. However, this is not frequently done and it certainly is not done after every use. At a public telephone oftentimes the mouthpiece or earpiece is not removable to prevent vandalism. Some hotel guests carry a spray disinfectant with them to kill germs on the room's telephone prior to their use of it. But carrying and using a bulky aerosol at a regular public telephone is awkward at best.

Clearly, the standard telephone does not provide much protection from residue left by the prior user.

The object of the present invention is to provide a telephone mouthpiece and earpiece protective cover to reduce surface contamination on the mouthpiece and earpiece of the telephone and to reduce the likelihood of the user of the protective cover device being exposed to any microorganisms remaining on the mouthpiece or earpiece by a prior user.

SUMMARY OF THE PRESENT INVENTION

The present invention overcomes those problems commonly associated with telephone mouthpieces and earpieces by providing a practical cover that provides protection, portability and easy fitting to and removal from the mouthpiece and earpiece of a telephone handset.

The protective cover of the present invention includes a mouthpiece and earpiece protective cover member and a contiguous skirt depending from the mouthpiece and earpiece protective cover member. Locking tabs are provided on the inside of the contiguous skirt to readily and easily fasten the protector over the telephone mouthpiece and earpiece. The locking tabs may be provided at any desired angular interval. A portion of the mouthpiece and earpiece cover member is cut away to ensure that the cover members fit over the telephone mouthpiece and earpiece.

A flange extends from the protective cover to use for quick and simple removal of the protective cover from a telephone mouthpiece and earpiece.

Slots extend in a lengthwise manner across the mouthpiece and earpiece protective cover member. Deflector bars are recessed below the level of the protective cover member and partially include the slots. The deflector bars are attached to the protective cover member at two ends leaving apertures from the surfaces of the bars to the protective cover surface to allow sound waves from the user to travel to the mouthpiece.

However, the deflector bars reduce the chances of surface contamination on the mouthpiece and earpiece touching the user. The protective cover member of the cover keeps the user's lips and ears from actually touching the mouthpiece or earpiece surface. The protective cover can be manufactured from plastic material sufficiently strong enough to resist chemical and high autoclaving temperatures for sterilizing.

Protective cover devices of this invention could be used in hospitals and hotels to slow the spread of germs. The protective cover could be disposed of when the patient or guest leaves or the cover could be sterilized and re-used. If used by a hotel or other business, indicia such as advertising, slogans or corporate colors could be included on the device. The protective cover can possibly be made in colors of local sports teams including their logos (with their permission) as the shape of the preferred embodiment of the protective cover somewhat resembles a cap. Corrugations running from the slots can be extended down the skirt and across the flange for a pleasing visual effect.

The protective covering device can be very advantageous where employees on different work shifts use the same phone as in a bank, credit card department, or telephone marketing company. Each worker can have his own protective covering device and use it during his shift to protect himself and then remove it, so the next shift worker attaches his own protective cover.

Other advantages and features of the present invention will become apparent from the following detailed description when read in conjunction with the accompanying drawings.

BRIEF DESCRIPTION OF THE DRAWINGS

A better understanding of the present invention will be achieved upon reference to the following detailed description, when read in conjunction with the accompanying drawings, wherein like reference characters refer to like parts and in which:

FIG. 4 is an end view of the protective cover;

FIG. 5 is an exploded view illustrating a variation of a protective cover; and

FIG. 6 is a cross-section similar to FIG. 2 of another variation of a protective cover.

DETAILED DESCRIPTION OF THE INVENTION AND PREFERRED EMBODIMENT THEREOF

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
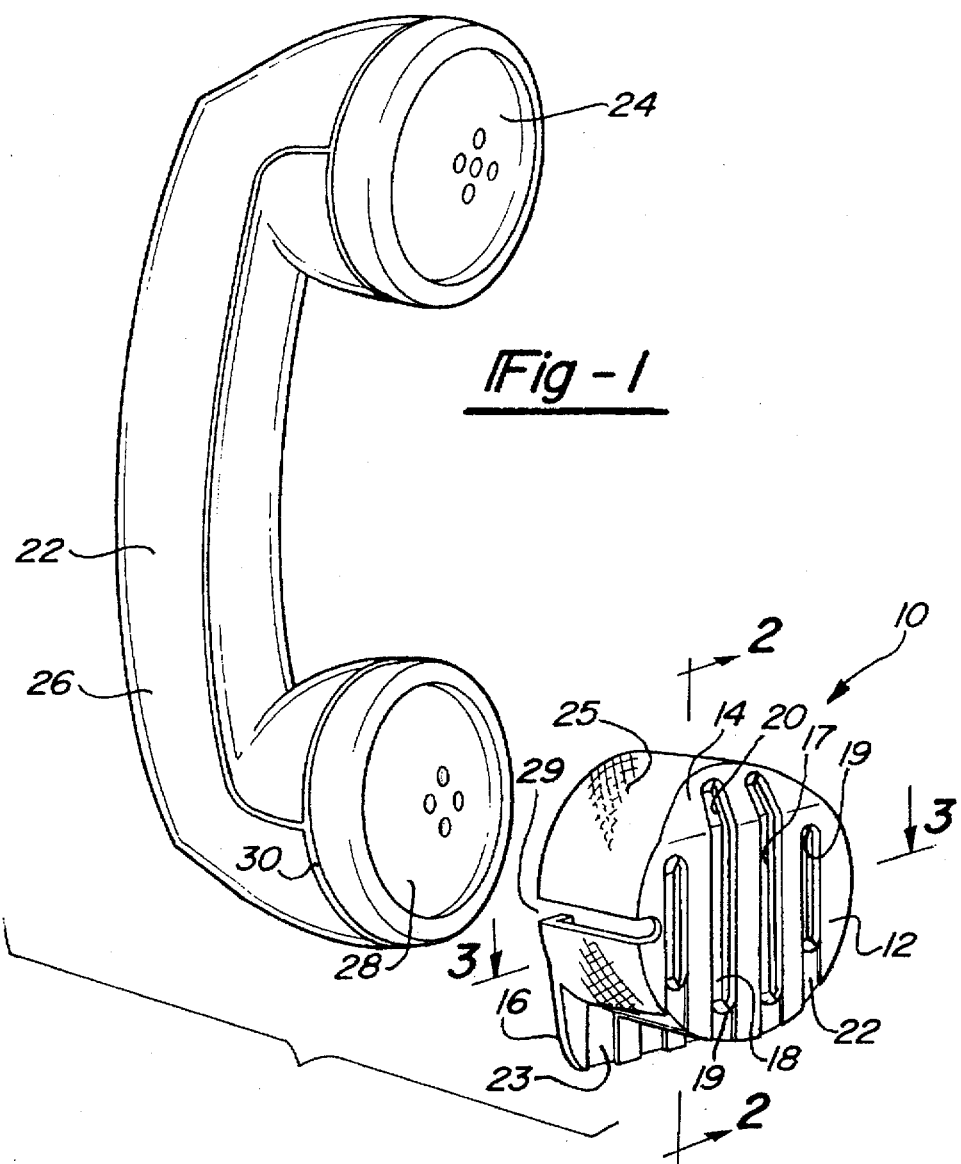
FIG. 1 is an exploded view illustrating a protective cover for a telephone mouthpiece, according to the present invention.
Figure 2:
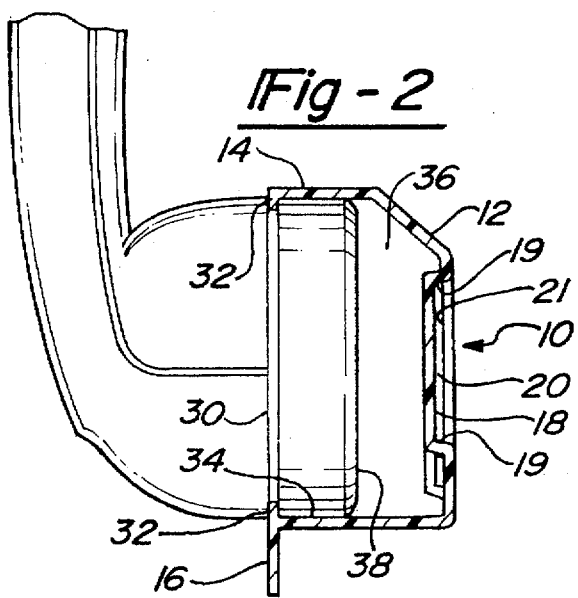
FIG. 2 is a sectional view with an enlarged section of the locking tab of the protective cover taken along line 2—2 of FIG. 1.

FIG. 1 is an exploded view showing a telephone handset 22 with a telephone mouthpiece protective cover 10. The protective cover, generally indicated as 10, comprises a cover member 12, a contiguous skirt 14, and a detachment flange 16. The face of the cover member 12 may be planar as shown or may have a slightly convex or concave surface as can be envisioned for aesthetic purposes. The cover member 12 has a plurality of openings, such as slots 17. Deflector bars 18 are recessed lower than an internal surface 21 (see FIG. 2) of the cover member 12 and partially occlude the slots 17. The ends 19 of the deflector bars 18 are attached to the cover member 12 as shown in FIG. 2. Apertures 20 are created between the deflector bars 18 and the internal surface of the cover member 12. Corrugations 23, for aesthetic purposes, extend from the cover member 12 down the contiguous skirt 14 and across the detachment flange 16, on the outside of the protective cover 10. Indicia 25 may further be imprinted on the skirt 14 of the cover member 12.

The standard telephone handset 22, as shown in FIG. 1, has an earpiece 24, a body 26 and a mouthpiece 28. A groove 30 is created where the mouthpiece 28 is fastened to the body 26 of the telephone handset. An earpiece protective cover (not shown) formed essentially similar to the telephone mouthpiece protective cover 10 can be used on the telephone earpiece 24. A portion of the cover member 12 is cutaway, at 29, to ensure that the member 12 fits over either the earpiece 24 or mouthpiece 28. Those skilled in the art will recognize the cover can be mounted to the earpiece as well as the mouthpiece or both.

FIG. 2 is a partial cross-section showing the protective cover 10 attached to the telephone handset 22. Locking tabs 32, rotated 45 degrees for clarity, are formed on the inside surface 34 of the contiguous skirt 14. The locking tabs 32 snap into the groove 30 on the telephone handset 22 to lock the protective cover to the handset 22. When the locking tabs 32 are inserted in groove 30, the cover member 12 is separated from the mouthpiece surface 38 by a space 36.

Figure 3:
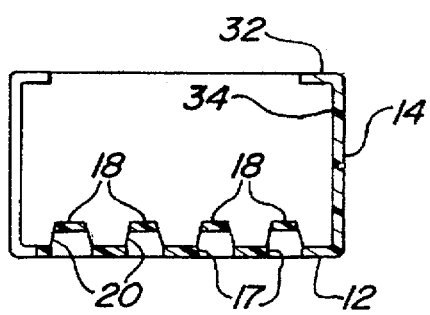
FIG. 3 is a sectional view of the protective cover taken along line 3—3 of FIG. 1.

A cross-sectional view of the protective cover 10, taken along section lines 3—3, is shown in FIG. 3. The locking tabs 32 are shown inwardly extending from the inside surface 34 of the contiguous skirt 14 of the protective cover 10. The slots 17 are again shown extending through the cover member 12 to form the apertures 20 between the inside surface of the cover member 12 and the deflector bars 18 on opposite sides of each slot 17.

FIG. 4 is an end view of the protective cover 10. The locking tabs 32 are shown extending radially inwardly from the inside surface 34 of the skirt 14.

A variation 41 of the protective cover 10 is shown in FIG. 5. The variation 41 has a box like configuration shaped to fit onto a rectangularly shaped mouthpiece 39 or earpiece (not shown). Contiguous skirts 40 depend in a direction normal to a cover member 42. A detachment flange 43 is attached to and extends downwardly from a lower skirt 40 to facilitate the removal of the protective cover 41. A cut-away portion of the cover member 42 is again shown at 45.

FIG. 6 shows another variation 44 of the protective cover according to the present invention. A frustoconical intermediate surface 46 tapers outwardly from a cover member 48 to a contiguous skirt 50. Locking tabs 52 are provided to hold the protective cover 44 onto a telephone handset 54. A flange 56 extends from the contiguous skirt 50. A portion 58 is cutaway from the cover 44 again to provide a snug fit over the telephone mouthpiece or earpiece.

Having described my invention, many modifications thereto will become apparent to those skilled in the art to which it pertains without deviation from the spirit of the invention as defined by the scope of the appended claims:

I claim:

1. A protective cover for use with a mouthpiece or an earpiece of a telephone handset, said protective cover comprising:

a cover member constructed of a resilient material and having a face, a contiguous skirt encircling said face and extending from said face and a flange having a generally planar gripping surface extending from said contiguous skirt;

a plurality of elongated slots formed in said face;

a plurality of recessed members corresponding in shape to said elongated slots and being positioned a predetermined and inwardly spaced distance from said slots by connecting portions located at opposite ends of said slots, a plurality of apertures being created by the separations between said slots and said recessed members and said recessed members being in alignment with said slots; and means for releasably securing said cover member to the telephone handset so that said face overlays the mouthpiece or earpiece at a predetermined spaced distance;

said flange being acted upon by a user to selectively engage and disengage said releasably securing means of said cover member to and from the telephone handset.

2. The protective cover for use with a telephone mouthpiece or earpiece as described in claim 1, further comprising a cutaway portion formed in said cover member and said skirt to provide additional elasticity to said cover member and to ensure a secure fit over the mouthpiece or earpiece.

3. The protective cover for use with a telephone mouthpiece or earpiece as described in claim 1, said releasably securing means further comprising at least one locking tab extending radially inwardly from an inside surface of said contiguous skirt, said locking tab engaging a corresponding groove in the phone handset.

4. The protective cover for use with a telephone mouthpiece or earpiece as described in claim 1, wherein said face of said cover member has a generally square shape.

5. The protective cover for use with a telephone mouthpiece or earpiece as described in claim 1, wherein said cover member and said contiguous skirt are constructed of a plastic material.

6. The protective cover for use with a telephone mouthpiece or earpiece as described in claim 1, further comprising a design indicia imprinted on said protective cover.

7. The protective cover for use with a telephone mouthpiece or earpiece as described in claim 1, further comprising a plurality of corrugations formed in said cover member, said corrugations extending across said contiguous skirt and said flange.

8. The protective cover for use with a telephone mouthpiece or earpiece as described in claim 1, wherein said face of said cover member has a generally circular shape.

9. The protective cover for use with a telephone mouthpiece or earpiece as described in claim 1, wherein said contiguous skirt depending from said cover member has a generally cylindrical shape.

10. The protective cover for use with a telephone mouthpiece or earpiece as described in claim 1, further comprising a frustoconical surface connecting said cover member to said contiguous skirt, said frustoconical surface tapering outwardly from said cover member to said contiguous skirt.

* * * * *